US012708931B2

(12) United States Patent
Kim et al.

(10) Patent No.: US 12,708,931 B2
(45) Date of Patent: Aug. 18, 2026

(54) APPARATUS FOR REMOVING FOREIGN MATTER ON HOT-ROLLED STEEL STRIP

(71) Applicant: POSCO CO., LTD, Pohang-si (KR)

(72) Inventors: Kyungseok Kim, Pohang-si (KR); Wankee Hong, Pohang-si (KR); Sukjin Yoo, Pohang-si (KR); Hyun Yoo, Gwangyang-si (KR); Sanghui Lee, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 217 days.

(21) Appl. No.: 18/730,847

(22) PCT Filed: Oct. 4, 2023

(86) PCT No.: PCT/KR2023/015199
§ 371 (c)(1),
(2) Date: Jul. 22, 2024

(87) PCT Pub. No.: WO2024/136032
PCT Pub. Date: Jun. 27, 2024

(65) Prior Publication Data

US 2025/0100021 A1 Mar. 27, 2025

(30) Foreign Application Priority Data

Dec. 20, 2022 (KR) ........................ 10-2022-0179013

(51) Int. Cl.
*B08B 3/02* (2006.01)
*B21B 38/00* (2006.01)
(Continued)

(52) U.S. Cl.
CPC .............. *B08B 3/022* (2013.01); *B21B 38/00* (2013.01); *B21B 45/0275* (2013.01);
(Continued)

(58) Field of Classification Search
CPC ...................................................... B08B 3/022
See application file for complete search history.

(56) References Cited

FOREIGN PATENT DOCUMENTS

CN 205074355 U 3/2016
CN 109174980 A 1/2019
(Continued)

OTHER PUBLICATIONS

Communication under Rule 71(3) EPC dated Jan. 19, 2026, issued in European Application No. 23 907 318.2.
(Continued)

*Primary Examiner* — Atul P. Khare
(74) *Attorney, Agent, or Firm* — Sughrue Mion, PLLC

(57) ABSTRACT

Provided is an apparatus of removing foreign substances from a hot-rolled steel strip, including a reverse direction injection unit provided to inject high-pressure water in the reverse direction of a moving direction of the strip toward the strip moving to the entrance of the winder by the side guide, wherein the reverse direction injection unit includes a plurality of upper reverse direction injection nozzles arranged along a width direction of the strip to inject high-pressure water to an upper surface of the strip, and the plurality of upper reverse direction injection nozzles is arranged such that an interval of the upper reverse direction injection nozzles located in a central area along the above arrangement direction is narrower than an interval of the upper reverse direction injection nozzles located in both edge areas.

15 Claims, 6 Drawing Sheets

(51) Int. Cl.

| | |
|---|---|
| ***B21B 45/02*** | (2006.01) |
| ***B21B 45/08*** | (2006.01) |
| ***B21C 47/34*** | (2006.01) |
| ***B21C 51/00*** | (2006.01) |

(52) U.S. Cl.
CPC .......... *B21B 45/0287* (2013.01); *B21B 45/08* (2013.01); *B21C 47/3416* (2013.01); *B21C 51/00* (2013.01)

(56) References Cited

FOREIGN PATENT DOCUMENTS

| | | | | | |
|---|---|---|---|---|---|
| EP | 1 201 037 | B1 | | 11/2003 | |
| JP | 59-183931 | A | | 10/1984 | |
| JP | 5-49107 | U | | 6/1993 | |
| JP | 05-177242 | A | | 7/1993 | |
| JP | 7-178439 | A | | 7/1995 | |
| JP | 2019-147165 | A | | 9/2019 | |
| KR | 10-0808360 | B1 | | 2/2008 | |
| KR | 10-2012-0110356 | A | | 10/2012 | |
| KR | 10-2013-0044691 | A | | 5/2013 | |
| KR | 10-2013-0067643 | A | | 6/2013 | |
| KR | 10-1353622 | B1 | | 1/2014 | |
| KR | 10-2014-0024474 | A | | 2/2014 | |
| KR | 20140042513 | A | * | 4/2014 | ......... B21B 45/0233 |
| KR | 10-2019-0032833 | A | | 3/2019 | |
| KR | 20190044778 | A | * | 5/2019 | ........... B21B 39/008 |
| WO | WO-2020036328 | A1 | * | 2/2020 | ............. B21B 45/02 |

OTHER PUBLICATIONS

International Search Report for PCT/KR2023/015199 dated Jan. 23, 2024.

Extended European Search Report dated Apr. 3, 2025 in Application No. 23907318.2.

Japanese Office Action dated Jun. 24, 2025 in Application No. 2024-544411.

* cited by examiner

【FIG 1】
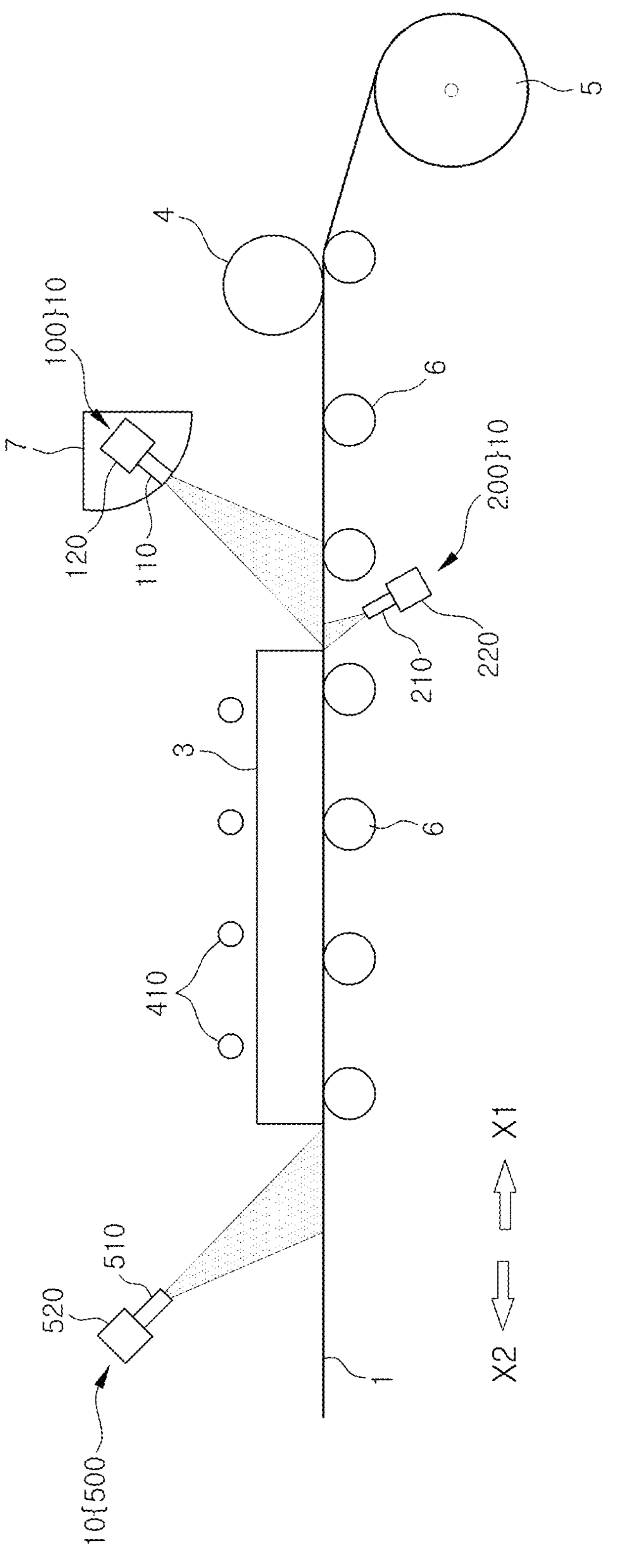

【FIG 2】
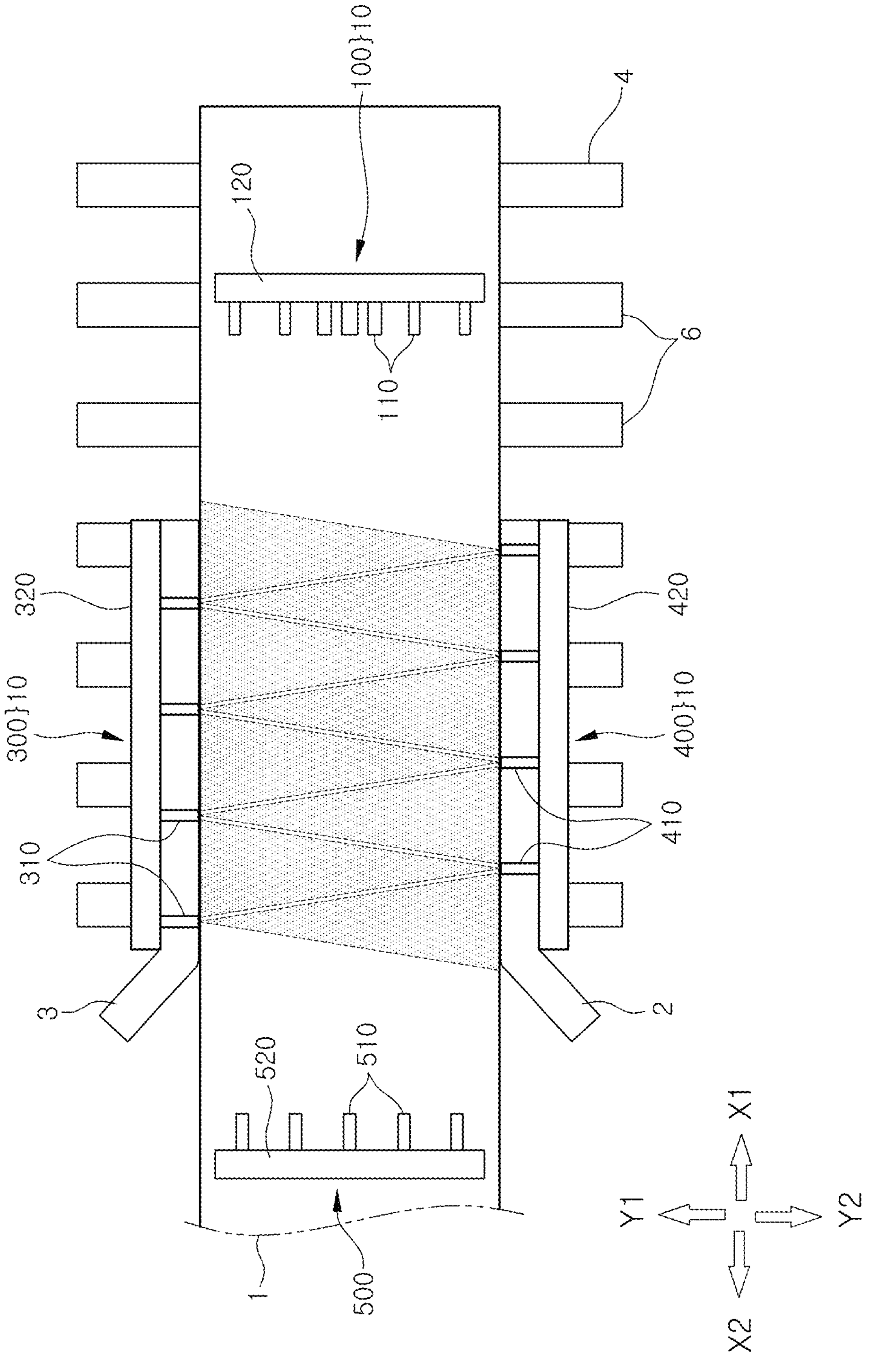

【FIG 3】
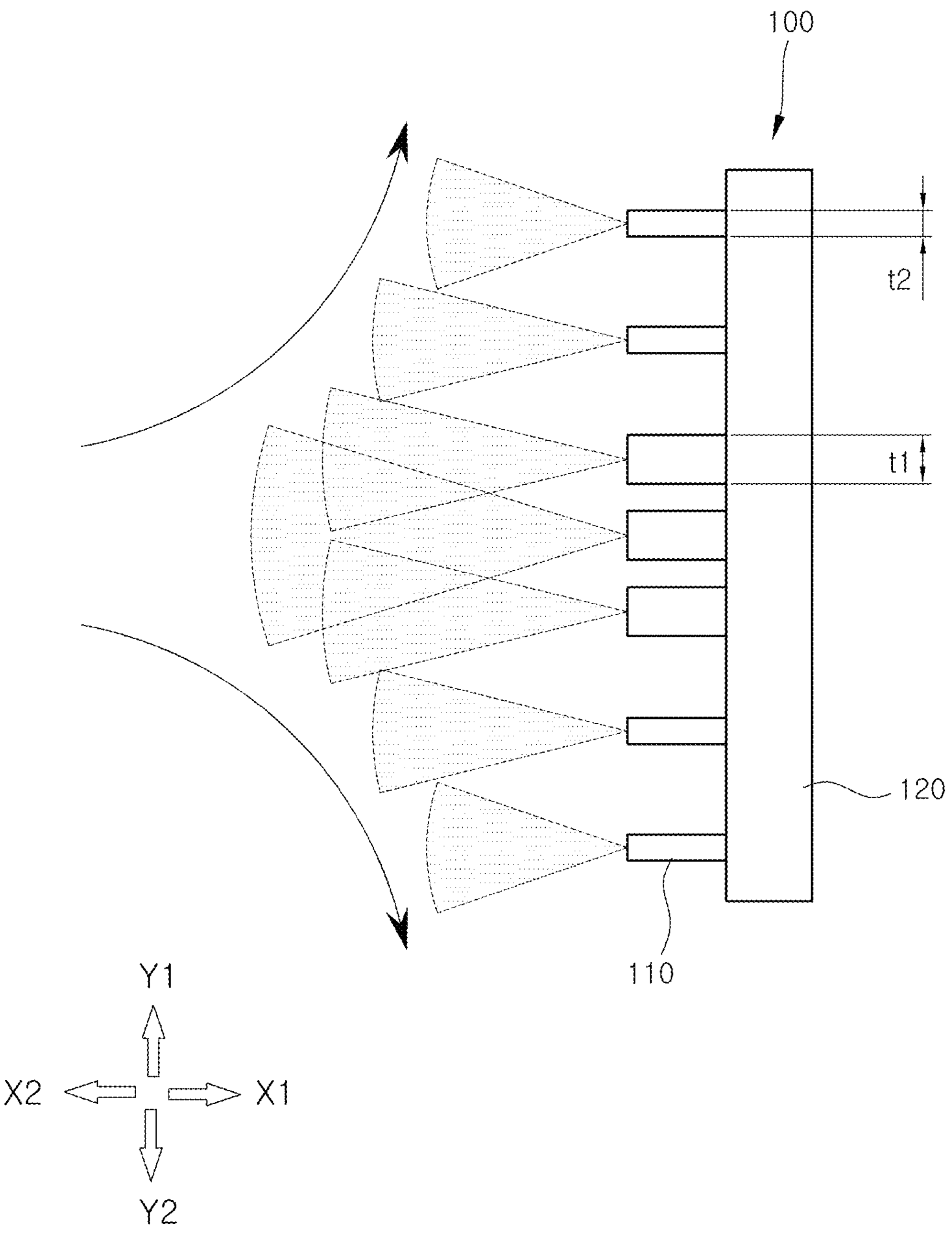

【FIG 4】
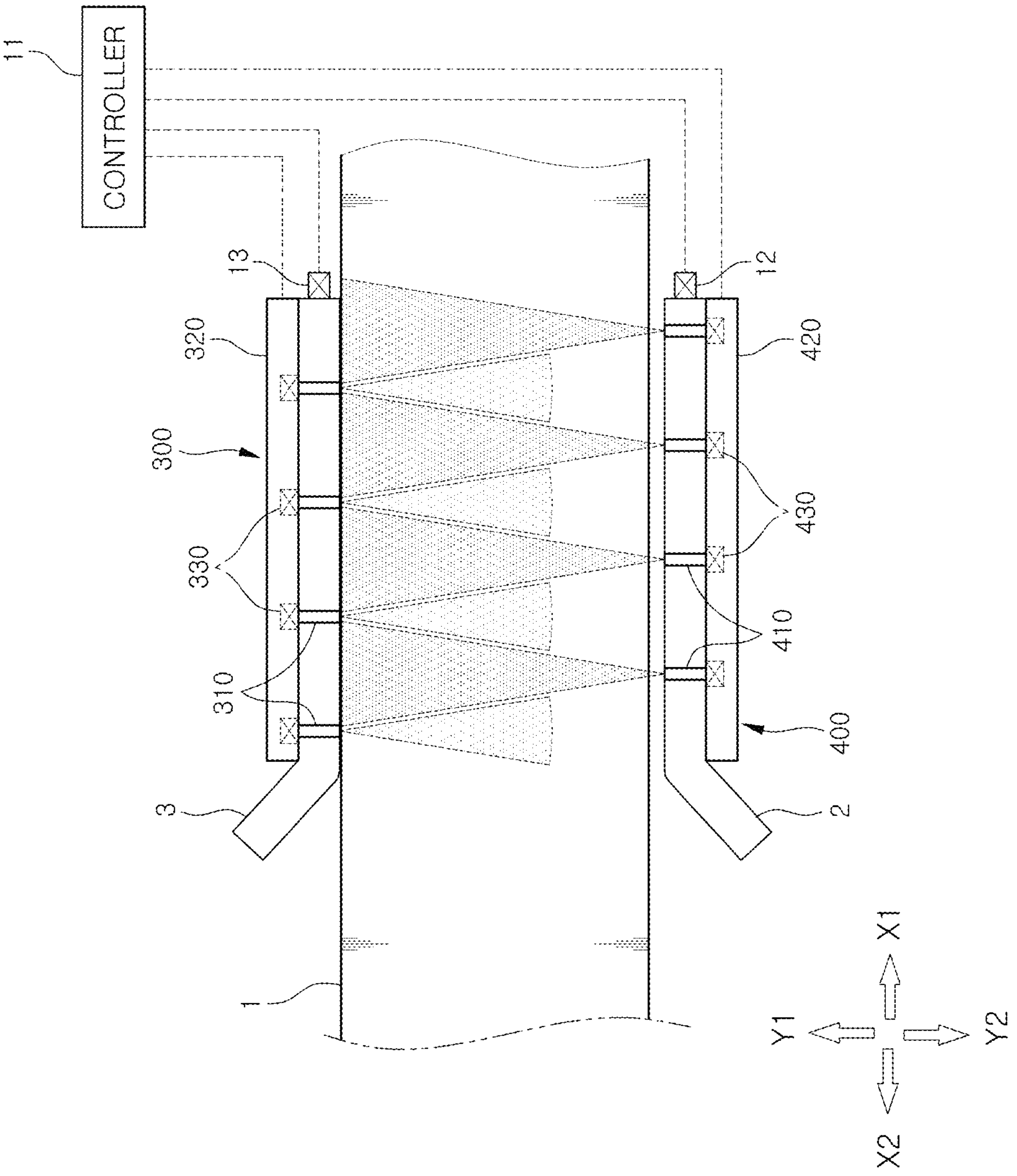

【FIG 5】
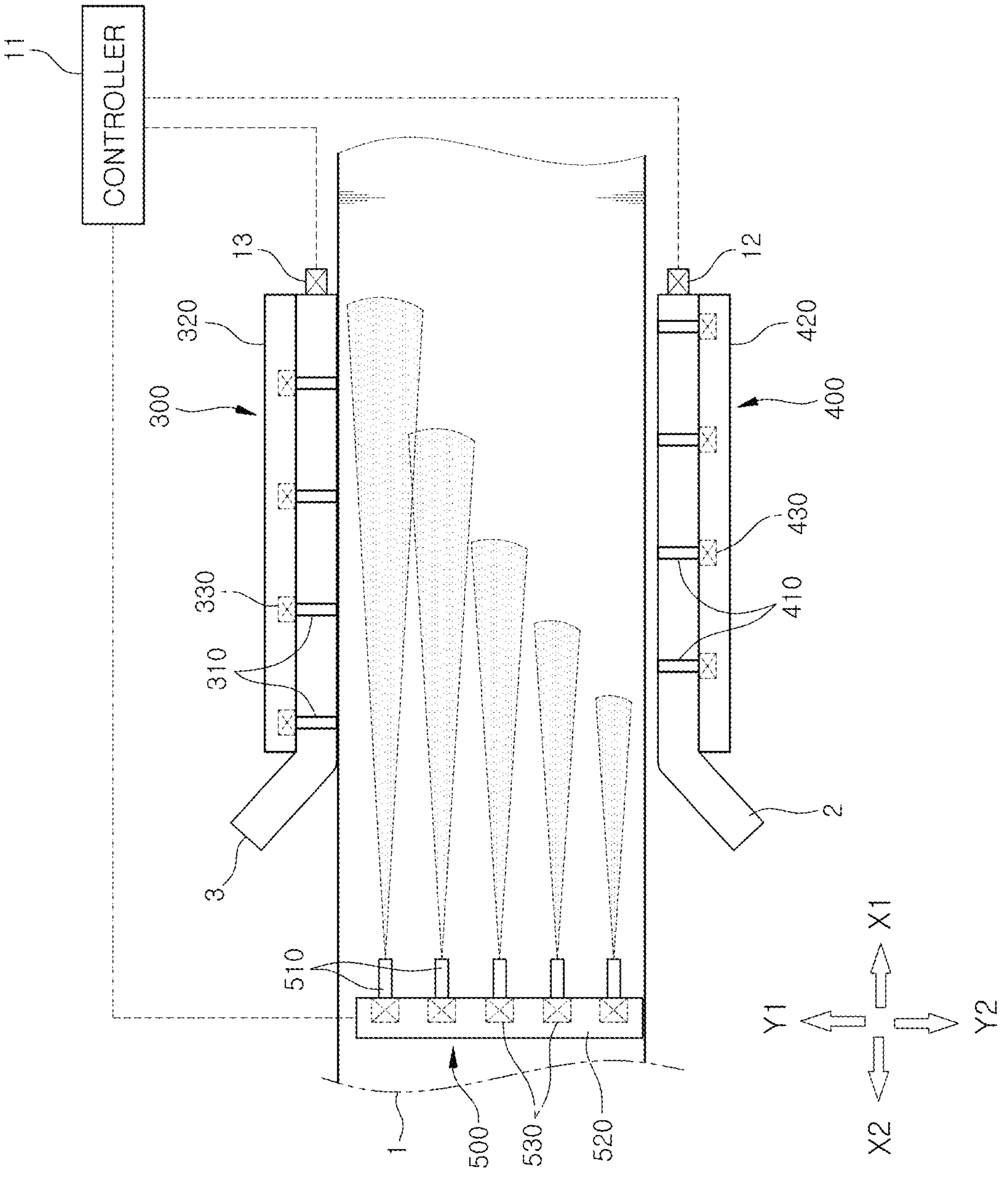

【FIG 6】
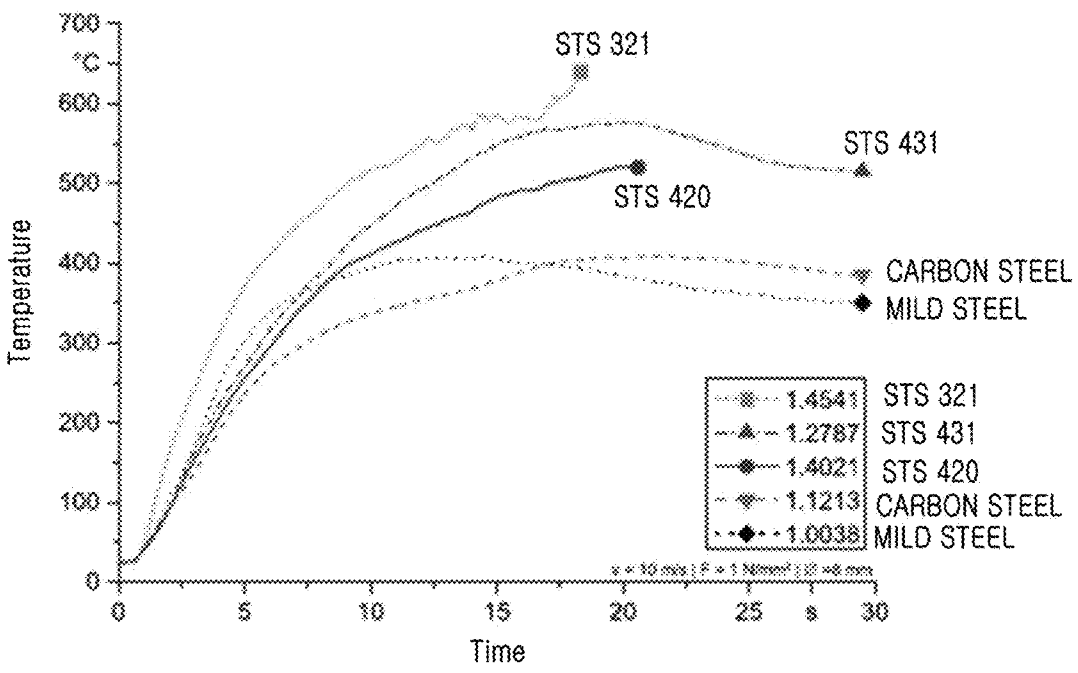

APPARATUS FOR REMOVING FOREIGN MATTER ON HOT-ROLLED STEEL STRIP

CROSS REFERENCE TO RELATED APPLICATIONS

This application is a National Stage of International Application No. PCT/KR2023/015199 filed Oct. 4, 2023, claiming priority based on Korean Patent Application No. 10-2022-0179013 filed Dec. 20, 2022, the entire disclosures of which are incorporated herein by reference.

TECHNICAL FIELD

The present disclosure relates to an apparatus of removing foreign substances from a hot-rolled steel strip, which is capable of effectively preventing the foreign substances from entering the strip wound in the form of a coil in a winding section in a hot rolling process.

BACKGROUND ART

In a hot rolling factory, a hot-rolled coil, which is a product required by a consumer or as a material for a cold rolling process that is a post-process, is produced by heating a slab, which is made at steelmaking and casting factories, with a certain temperature in a heating furnace, rolling the slab thinly by continuously passing the slab between rolls, and then winding the slabs in the form of a coil.

Main facilities for the hot rolling process include a heating furnace, a rough rolling apparatus, a finishing rolling apparatus, a winder, side guides, and the like. The side guides guide a strip to be moved toward an entrance of the winder.

When the strip is biased to one side, foreign substances may be generated as sparks occur between the strip and the side guide due to friction, and the foreign substances may be attached to a surface of the strip. When the strip is wound in the winder in this state, defects may occur on the surface of the strip as pressurization flaws by the foreign substances are formed on the strip surface.

DISCLOSURE

Technical Problem

The present disclosure is directed to providing an apparatus of removing foreign substances from a hot-rolled steel strip, which is capable of effectively preventing the foreign substances from entering the strip wound in the form of a coil in a winding section in a hot rolling process.

The present disclosure is directed to providing an apparatus of removing foreign substances from a hot-rolled steel strip, which is capable of preventing the foreign substances from entering the strip wound in the form of a coil in a winding section in a hot rolling process in advance.

Technical Solution

An aspect of the present disclosure provides an apparatus of removing foreign substances from a hot-rolled steel strip, which is configured to prevent the foreign substances generated by friction between a strip and a side guide provided to guide a movement of the strip toward an entrance of a winder in a hot rolling process, includes a reverse direction injection unit provided to inject high-pressure water in the reverse direction of a moving direction of the strip toward the strip moving to the entrance of the winder by the side guide, wherein the reverse direction injection unit includes a plurality of upper reverse direction injection nozzles arranged along a width direction of the strip to inject high-pressure water to an upper surface of the strip, and the plurality of upper reverse direction injection nozzles is arranged such that an interval of the upper reverse direction injection nozzles located in a central area along the above arrangement direction is narrower than an interval of the upper reverse direction injection nozzles located in both edge areas.

The plurality of upper reverse direction injection nozzles may be arranged such that the injection nozzles located in the central area inject a larger flow rate of high-pressure water than the injection nozzles located in the both edge areas in the arrangement direction.

The upper reverse direction injection nozzles located in the central area may be provided to have a diameter larger than a diameter of the upper reverse direction injection nozzles located in the both edge areas.

The apparatus may further include a lateral direction injection unit provided to inject high-pressure water between the side guide and the strip.

The lateral direction injection unit may be provided to be capable of regulating a high-pressure water injection flow rate to increase a flow rate of high-pressure water to be injected in proportion to a threshold temperature at which sparks occur in the strip depending on a steel type.

The side guide may include a first side guide provided to support one side in the width direction of the strip, and a second side guide provided to support the other side in the width direction of the strip, the lateral direction injection unit may include a first lateral direction injection unit provided to inject high-pressure water between the first side guide and the one side of the strip, and a second lateral direction injection unit provided to inject high-pressure water between the second side guide and the other side of the strip, the first lateral direction injection unit and the second lateral direction injection unit may be provided to be capable of regulating a high-pressure water injection flow rate, and the first lateral direction injection unit and the second lateral direction injection unit may regulate the high-pressure water injection flow rate to increase the high-pressure water injection flow rate to a side guide having larger friction with the strip among the first side guide and the second side guide.

The apparatus may further include a first sensing unit provided to detect a frictional force between the first side guide and the strip, a second sensing unit provided to detect a frictional force between the second side guide and the strip, and a controller electrically connected to the first sensing unit, the second sensing unit, the first lateral direction injection unit, and the second lateral direction injection unit, wherein the controller may compare the frictional force detected through the first sensing unit and the frictional force detected through the second sensing unit, and as a result of the comparison of the frictional forces, regulate high-pressure water injection flow rates of the first lateral direction injection unit and the second lateral direction injection unit to increase the high-pressure water injection flow rate to a side guide having larger friction with the strip among the first side guide and the second side guide.

The apparatus may further include a forward direction injection unit provided to inject high-pressure water in the moving direction of the strip from an upstream side of the side guide toward the upper surface of the strip, wherein the side guide may include a first side guide provided to support one side in the width direction of the strip, and a second side guide provided to support the other side in the width direction of the strip, and the forward direction injection unit may be capable of biasedly injecting a high-pressure water injection flow rate to any one of the first side guide and the second side guide.

The forward direction injection unit may include a plurality of forward injection nozzles arranged along the width direction of the strip to inject high-pressure water to the upper surface of the strip, each of which is provided to regulate the high-pressure water injection flow rate, and the plurality of forward injection nozzles may regulate the high-pressure water injection flow rate to increase the high-pressure water injection flow rate to a side guide having larger friction with the strip among the first side guide and the second side guide.

The apparatus may further include a first sensing unit provided to detect a frictional force between the first side guide and the strip, a second sensing unit provided to detect a frictional force between the second side guide and the strip, and a controller electrically connected to the first sensing unit, the second sensing unit, and the plurality of forward injection nozzles, wherein the controller may compare the frictional force detected through the first sensing unit and the frictional force detected through the second sensing unit, and as a result of the comparison of the frictional forces, regulate high-pressure water injection flow rates of the plurality of forward injection nozzles to increase the high-pressure water injection flow rate to a side guide having larger friction with the strip among the first side guide and the second side guide.

Advantageous Effects

An apparatus of removing foreign substances from a hot-rolled steel strip according to the present disclosure can effectively prevent the foreign substances from entering the strip wound in the form of a coil in a winding section in a hot rolling process.

An apparatus of removing foreign substances from a hot-rolled steel strip according to the present disclosure can prevent the foreign substances from entering the strip wound in the form of a coil in a winding section in a hot rolling process in advance.

DESCRIPTION OF DRAWINGS

FIG. 1 illustrates a side structure of an apparatus of removing foreign substances from a hot-rolled steel strip according to an embodiment of the present disclosure.

FIG. 2 illustrates a planar structure of the apparatus of removing foreign substances from the hot-rolled steel strip according to an embodiment of the present disclosure.

FIG. 3 is a plan view illustrating an operation of an upper reverse direction injection unit in the apparatus of removing foreign substances from the hot-rolled steel strip according to an embodiment of the present disclosure.

FIG. 4 is a plan view illustrating operations of lateral direction injection units in the apparatus of removing foreign substances from the hot-rolled steel strip according to an embodiment of the present disclosure.

FIG. 5 is a plan view illustrating an operation of a forward direction injection unit in the apparatus of removing foreign substances from the hot-rolled steel strip according to an embodiment of the present disclosure.

FIG. 6 illustrates a spark occurrence threshold temperature for each steel type applied to the apparatus of removing foreign substances from the hot-rolled steel strip according to an embodiment of the present disclosure.

MODE OF THE DISCLOSURE

Throughout the present specification, the same reference numbers refer to the same components. The present specification does not explain all the components in the embodiments, and general contents in the technical field to which the present disclosure belong or the overlapping contents between embodiments may be omitted. Terms such as 'parts,' 'modules,' 'members,' and 'blocks' used in the specification may be implemented as software or hardware, and depending on the embodiments, a plurality of 'parts,' 'modules,' 'members,' and 'blocks' may be implemented as a single component, or one 'parts,' 'modules,' 'members,' and 'blocks' may also include a plurality of components.

Throughout the specification, when one part is referred to as being "connected" to the other part, it includes "directly connected" to the other part and "indirectly connected" to the other part, and the "indirectly connected" to the other part includes "connected" to the other part through a wireless communication network.

Also, when a part is referred to as "includes" any component, this refers to further including another component, not excluding another component, as long as there is no particularly opposite description.

When any component is referred to as being located "on" or "over" another component, this includes not only a case in which any component is in contact with another component but also a case in which another component is present between the two components.

Terms such as "first" and "second" are used to distinguish one component from other components, and the components are not limited by the above terms.

The singular form of a noun corresponding to an item may include a plurality of items, unless the relevant context clearly dictates otherwise.

In each step, an identification numeral is used for convenience of explanation, the identification numeral does not describe the order of the steps, and each step may be performed differently from the order specified unless the context clearly states a particular order.

Hereinafter, the principles and embodiments of the present disclosure will be described in detail with reference to the accompanying drawings.

FIGS. 1 and 2 illustrate a winding section in a hot rolling process in which an apparatus 10 of removing foreign substances from a hot-rolled steel strip (hereinafter, an apparatus of removing foreign substances) according to an embodiment of the present disclosure is applied.

As illustrated in FIGS. 1 and 2, in the winding section in the hot rolling process in which the apparatus 10 of removing foreign substances is applied, side guides 2 and 3, a pinch roll 4, and a winder 5 may be disposed along a moving direction of a strip 1.

In the hot rolling process, a plurality of measuring instruments (not shown) may be provided upstream of the winding section to measure a surface defect or width of the strip 1.

In the drawings, a direction of an arrow X1 indicates the moving direction of the strip 1, and a direction of an arrow X2 indicates a reverse direction of the moving direction of the strip 1. The direction of the arrow X1 may be a downstream direction of a hot rolling process line, and the direction of the arrow X2 may be an upstream direction of the hot rolling process line. Directions of arrows Y1 and Y2 indicate one side and the other side in a width direction of the strip 1, respectively.

A pair of the side guides 2 and 3 may include the first side guide 2 provided to support and guide the one side in the width direction of the strip 1, and the second side guide 3 provided to support and guide the other side in the width direction of the strip.

A plurality of support rolls 6 may be provided upstream of the pinch roll 4 to support the strip 1 to be guided to the winder 5, and the side guides 2 and 3 may support both sides of the strip 1 moving along the support rolls 6 so that the strip 1 may be correctly guided to the winder 5. The winder 5 may form a hot-rolled coil by winding the strip 1 guided through the pinch rolls 4.

When the strip 1 moving to the winder 5 is biased to one side, foreign substances may be generated as sparks occur between the strip 1 and the side guide 2 or 3 due to friction. These foreign substances may be attached to a surface of the strip 1, and when the strip 1 is wound in the winder 5 in this state, defects may occur on the surface of the strip as pressurization flaws by the foreign substances are formed on the strip surface.

The apparatus 10 of removing foreign substances according to an embodiment of the present disclosure, which is provided to prevent the foreign substances generated as described above from entering the strip 1, may include reverse direction injection units 100 and 200 provided to inject high-pressure water in the reverse direction of the moving direction of the strip 1 toward the strip 1 moving to an entrance of the winder 5 by the side guides 2 and 3.

The high-pressure water injected to the surface of the strip 1 by the reverse direction injection units 100 and 200 may remove the foreign substances from the surface of strip 1 before passing through the pinch roll 4 to prevent the foreign substances from entering the strip 1 wound in the winder 5.

The reverse direction injection units 100 and 200 may include the upper reverse direction injection unit 100 located above a moving path of the strip 1 to inject high-pressure water to an upper surface of the strip 1, and the lower reverse direction injection unit 200 located below the moving path of the strip 1 to inject high-pressure water to a lower surface of the strip 1.

The upper reverse direction injection unit 100 may include a plurality of upper reverse direction injection nozzles 110 arranged along the width direction of the strip 1 to inject high-pressure water to the upper surface of the strip 1, and the lower reverse direction injection unit 200 may include a plurality of lower reverse direction injection nozzles 210 arranged along the width direction of the strip 1 to inject high-pressure water to the lower surface of the strip 1.

The upper reverse direction injection unit 100 may include a header 120 provided to receive high-pressure water, and the header 120 may be installed on an entry guide 7 located on an upper side between the side guides 2 and 3 and the pinch roll 4 to guide the strip 1 toward the pinch roll 4. The plurality of upper reverse direction injection nozzles 110 may be installed on the header 120 to be inclined downward at a predetermined inclination in order to inject high-pressure water toward the upper surface of the strip 1 in the reverse direction of the moving direction of the strip 1.

The lower reverse direction injection unit 200 may include a header 220 disposed between a downstream of the side guides 2 and 3 and the support roll 6, and the plurality of lower reverse direction injection nozzles 210 may be installed on the header 220 to be inclined upward at a predetermined inclination in order to inject high-pressure water toward the lower surface of the strip 1 in the reverse direction of the moving direction of the strip 1.

In the drawings, fan-shaped shapes in front of the injection nozzles indicate injection directions and high-pressure water injection flow rates injected through the corresponding injection nozzles.

A part of the high-pressure water injected to the strip 1 through the upper reverse direction injection unit 100 may remain on the upper surface of the strip 1. As time passes, this residual water may form a flow in the reverse direction of the moving direction of the strip 1 and be delivered to the measuring instrument (not shown) upstream of the winding section, which may cause disturbance of the measuring instrument (not shown).

In order to prevent this, as illustrated in FIG. 3, the plurality of upper reverse direction injection nozzles 110 may be arranged such that an interval of the upper reverse direction injection nozzles 110 located in a central area along an arrangement direction thereof is narrower than an interval of the upper reverse direction injection nozzles 110 located in both edge areas.

According to the arrangement of the upper reverse direction injection nozzles 110 as above, an injection pressure of high-pressure water injected through the central injection nozzles 110 having the narrow interval is relatively higher than an injection pressure of high-pressure water injected through the edge injection nozzles 110 having the wide interval.

Therefore, the injection pressure of high-pressure water pushing the residual water in the direction of the arrow X2 in the central area of the upper reverse direction injection nozzles 110 may become higher than the injection pressure of high-pressure water in the both edge areas, and thus the residual water may split in directions of arrows Y1 and Y2 along the width direction of the strip 1 based on the central area to be smoothly removed on the strip 1 so that there is no risk of the residual water flowing into the measuring instrument (not shown).

In order to enable a higher injection pressure of high-pressure water to be formed in the central area of the upper reverse direction injection unit 100 than in the both edge areas of the upper reverse direction injection unit 100, the injection nozzles 110 may be arranged such that the injection nozzles 110 located in the central area inject a larger flow rate of high-pressure water than the injection nozzles 110 located in the both edge areas in the arrangement direction. For this purpose, the upper reverse direction injection nozzles 110 located in the central area may be provided to have a diameter t1 larger than a diameter t2 of the upper reverse direction injection nozzles 110 located in the both edge areas.

For example, the plurality of upper reverse injection nozzles 110 may be provided such that the interval between the injection nozzles 110 continuously decreases from the both edge areas to the central area along the arrangement direction and the diameter of the injection nozzles 110 may be continuously increases from the both edge areas to the central area.

Of course, even in a case where the upper reverse direction injection nozzles 110 all have the same diameter and only the intervals for each area are different or the upper reverse direction injection nozzles 110 all have the same interval and the diameters thereof are different for each area, the upper reverse direction injection unit 100 may form a higher injection pressure of high-pressure water in the central area than in the both edge areas.

According to the method of varying the interval and diameter of the upper reverse direction injection nozzles 110 as described above, the upper reverse direction injection unit 100 may smoothly discharge residual water containing foreign substances from the strip 1 without changing the shape of the header 120 or a length of the upper reverse direction injection nozzles 110, and may be smoothly installed inside the narrow entry guide 7 without changing the design of the entry guide 7.

The apparatus 10 of removing foreign substances may include lateral direction injection units 300 and 400 provided to inject high-pressure water between the side guides 2 and 3 and the strip 1.

As illustrated in FIG. 2, high-pressure water injected from the lateral direction injection units 300 and 400 may fundamentally prevent sparks from occurring by cooling gaps between the side guides 2 and 3 and the strip 1. Therefore, according to the lateral direction injection units 300 and 400, foreign substances may be prevented from entering the strip 1, which is guided to the winder 5, in advance.

The lateral direction injection units 300 and 400 may include the first lateral direction injection unit 300 provided to inject high-pressure water between the first side guide 2 and one side of the strip 1, and the second lateral direction injection unit 400 provided to inject high-pressure water between the second side guide 3 and the other side of the strip 1.

The lateral direction injection units 300 and 400 may include headers 320 and 420 and a plurality of lateral direction injection nozzles 310 and 410 installed on the headers 320 and 420 along the moving direction of the strip 1, respectively.

The lateral direction injection nozzles 310 and 410 may include the first lateral direction injection nozzles 310 provided in the first lateral direction injection unit 300, and the second lateral direction injection nozzles 410 provided in the second lateral direction injection unit 400.

The first lateral direction injection unit 300 may be disposed above the second side guide 3 to inject high-pressure water between the opposite first side guide 2 and the strip 1. The second lateral direction injection unit 400 may be disposed above the first side guide 2 to inject high-pressure water between the opposite second side guide 3 and the strip 1.

In order to suppress mutual interference between the high-pressure water injected from the first lateral direction injection unit 300 and the high-pressure water injected from the second lateral direction injection unit 400, the first lateral direction injection nozzles 310 and the second lateral direction injection nozzles 410 may be arranged to alternate with each other.

The arrangement structures of the lateral direction injection units 300 and 400 are not limited to the above-described forms. The first lateral direction injection unit 300 may be disposed to be located above the first side guide 2, and the second lateral direction injection unit 400 may be disposed to be located above the second side guide 3, so that the respective lateral direction injection units 300 and 400 may inject high-pressure water vertically downward.

A threshold temperature at which sparks occur when friction occurs between the side guides 2 and 3 and the strip 1 may vary depending on the steel type of the strip 1.

FIG. 6 illustrates a relationship between the threshold temperature and time at which sparks occur for each steel type. As illustrated in FIG. 6, it may be confirmed that sparks occur at a higher threshold temperature in stainless steel than in mild steel or carbon steel. Even in the case of stainless steel, the threshold temperature for occurring sparks varies depending on the type.

Therefore, a flow rate of high-pressure water to cool the gaps between the strip 1 and the side guides 2 and 3 to suppress the occurrence of sparks may vary depending on the steel type of the strip 1.

The lateral direction injection units 300 and 400 may be provided to be capable of regulating a high-pressure water injection flow rate to increase the flow rate of high-pressure water to be injected in proportion to the threshold temperature at which sparks occur in the strip 1 depending on a steel type, so that the flow rate of high-pressure water to suppress sparks may be used efficiently.

That is, the lateral direction injection units 300 and 400 may be provided to relatively increase the flow rate of high-pressure water when the strip 1 is a steel type with a higher threshold temperature at which sparks occur than a steel type with a low threshold temperature, so that the flow rate of high-pressure water to suppress sparks may be used efficiently.

As illustrated in FIG. 4, the apparatus 10 of removing foreign substances may include a controller 11 and an input unit which is not shown. The lateral direction injection units 300 and 400 may include flow regulating valves 330 and 430 to regulate the flow rate of high-pressure water to be supplied to the lateral direction injection nozzles 310 and 410, respectively, and the flow regulating valves 330 and 430 may be electrically connected to the controller 11 to be controlled by the controller 11. The flow regulating valves 330 and 430 may be installed on the headers 320 and 420, respectively.

The steel type of the strip 1 may be input through the input unit (not shown), and the controller 11 may control the flow regulating valves 330 and 430 to regulate the flow rate of high-pressure water to be injected from the lateral direction injection nozzles 310 and 410 depending on the steel type of the strip input through the input unit (not shown).

The lateral direction injection units 300 and 400 may be provided to biasedly inject the high-pressure water injection flow rate to any one of the first side guide 2 and the second side guide 3 to increase the high-pressure water injection flow rate to the any one side guide having larger friction with the strip 1 among the first side guide 2 and the second side guide 3.

Therefore, the lateral direction injection units 300 and 400 may more effectively cool a gap between any one side guide, which has a relatively high risk of sparks occurring among the both side guides 2 and 3, and the strip 1 by using high-pressure water.

The apparatus 10 of removing foreign substances may include a first sensing unit 12 provided to detect a frictional force between the first side guide 2 and the strip 1, and a second sensing unit 13 provided to detect a frictional force between the second side guide 3 and the strip 1, in order to measure the frictional forces between the strip 1 and the both side guides 2 and 3.

The first sensing unit 12 and the second sensing unit 13 may be installed on the first side guide 2 and the second side guide 3, respectively, and each of the sensing unit 12 and 13 may be electrically connected to the controller 11. The first sensing unit 12 and the second sensing unit 13 may detect the magnitude of the frictional force between the strip 1 and the corresponding side guide 2 or 3 by measuring the magnitude of vibration occurring in the side guide 2 or 3 or the temperature change in the side guide 2 or 3 due to friction with the strip 1 when friction with the strip 1 occurs.

The first sensing unit 12 and the second sensing unit 13 may constantly detect the frictional force between the corresponding side guide 2 or 3 and the strip 1, and the controller 11 may compare the frictional force detected through the first sensing unit 12 and the frictional force detected through the second sensing unit 13. As a result of the comparison of the frictional forces, when the side guide 2 or 3 having a large friction with the strip 1 is confirmed, the controller 11 may control the flow regulating valves 330 and 430 to vary the flow rate of high-pressure water injected through the injection nozzles 310 of the first lateral direction injection unit 300 and the inject nozzles 410 of the second lateral direct injection unit 400, thereby increasing the high-pressure water injection flow rate to a side guide having a large friction with the strip 1 among the first side guide 2 and the second side guide 3.

For example, FIG. 4 illustrates that when the frictional force between the second side guide 3 and the strip 1 is larger than the frictional force between the first side guide 2 and the strip 1, the high-pressure water injection flow rate injected in the direction of the second side guide 3 from the second lateral direct injection unit 400 increases more than the high-pressure water injection flow rate injected in the direction of the first side guide 2 from the first lateral direct injection unit 300.

The apparatus 10 of removing foreign substances may further include a forward direction injection unit 500 provided to inject high-pressure water in the moving direction of the strip 1 from an upstream side of the side guides 2 and 3 toward the upper surface of the strip 1.

As illustrated in FIG. 1, the forward direction injection unit 500 may more reliably block the residual water on the strip 1 from flowing upstream of the winding section in which the measuring instrument (not shown) is located by injecting high-pressure water to the upper surface of the strip 1 from the opposite side of the upper reverse direction injection unit 100 between the side guides 2 and 3.

The forward direction injection unit 500 may include a header 520 and a plurality of forward injection nozzles 510 installed on the header 520 along the width direction of the strip 1.

The header 520 may be disposed on the upstream side of the side guides 2 and 3 along the moving path of the strip 1, and the plurality of forward injection nozzles 510 may be installed to be inclined downward on the header 520 to have a predetermined inclination to inject high-pressure water toward the upper surface of the strip 1 in the moving direction of the strip 1.

The plurality of forward injection nozzles 510 may be arranged along the width direction of the strip 1 and may be provided to individually regulate the high-pressure water injection flow rate.

As illustrated in FIG. 5, the forward direction injection unit 500 may include flow regulating valves 530 provided to regulate the flow rate of high-pressure water to be supplied to the forward injection nozzles 510, and the flow regulating valves 530 may be electrically connected to the controller 11 to be controlled by the controller 11. The flow regulating valves 530 may be installed in the header 520.

The forward direction injection unit 500 may be provided to biasedly inject the high-pressure water injection flow rate to any one of the first side guide 2 and the second side guide 3 to increase the high-pressure water injection flow rate to the any one side guide having larger friction with the strip 1 among the first side guide 2 and the second side guide 3.

Therefore, the forward direction injection unit 500 may more effectively cool a gap between any one side guide, which has a relatively high risk of sparks occurring among the both side guides 2 and 3, and the strip 1 by using high-pressure water.

The controller 11 may compare the frictional force detected through the first sensing unit 12 and the frictional force detected through the second sensing unit 13. As a result of the comparison of the frictional forces, when the side guide 2 or 3 having a large friction with the strip 1 is confirmed, the controller 11 may control the flow regulating valves 530 to regulate the high-pressure water injection flow rate injected through each of the forward direction injection nozzles 510, thereby increasing the high-pressure water injection flow rate to a side guide having a large friction with the strip 1 among the first side guide 2 and the second side guide 3.

For example, FIG. 5 illustrates the case in which the frictional force between the second side guide 3 and the strip 1 is larger than the frictional force between the first side guide 2 and the strip 1. In this case, the controller 11 may control the flow regulating valves 530 such that the high-pressure water injection flow rate of the forward direction injection nozzles 510 adjacent to the second side guide 3 is larger than the high-pressure water injection flow rate of the forward direction injection nozzles 510 adjacent to the first side guide 2, so that cooling performance in the gap between the second side guide 3 and the strip 1 may be relatively increased more than cooling performance in the gap between the first side guide 2 and the strip 1.

As described above, a structure of the apparatus 10 of removing foreign substances, in which each of the lateral direction injection units 300 and 400 and forward direction injection unit 500 may biasedly inject the high-pressure water injection flow rate in the direction of one of the side guides 2 and 3, may have the effect of increasing the cooling performance of one of the side guides 2 and 3, which has relatively large friction with the strip 1, by using high-pressure water, even when any one of the lateral direction injection units 300 and 400 and forward direction injection unit 500.

The invention claimed is:

1. An apparatus for removing foreign substances from a hot-rolled steel strip, the foreign substances generated by friction between the strip and a side guide provided to guide a movement of the strip toward an entrance of a winder in a hot rolling process, wherein the apparatus comprises the side guide, the winder, and a reverse direction injection unit configured to inject high-pressure water in the reverse direction of a moving direction of the strip toward the strip moving to the entrance of the winder by the side guide, the reverse direction injection unit comprises a plurality of upper reverse direction injection nozzles arranged along a width direction of the strip to inject high-pressure water to an upper surface of the strip, and the plurality of upper reverse direction injection nozzles is arranged such that an interval of the upper reverse direction injection nozzles located in a central area along the width direction is narrower than an interval of the upper reverse direction injection nozzles located in both of edge areas along the width direction, the upper reverse direction injection nozzles located in the central area having a diameter larger than a diameter of the upper reverse direction injection nozzles located in the both edge areas so as to inject a larger flow rate of high-pressure water.

2. The apparatus according to claim 1, wherein the diameter of the upper reverse direction injection nozzles continuously increases from the both edge areas to the central area.

3. The apparatus according to claim 1, further comprising a lateral direction injection unit configured to inject high-pressure water between the side guide and the strip.

4. The apparatus according to claim 3, wherein the lateral direction injection unit is configured to regulate a high-pressure water injection flow rate to increase a flow rate of high-pressure water to be injected in proportion to a threshold temperature at which sparks occur in the strip depending on a steel type thereof.

5. The apparatus according to claim 3, wherein the side guide comprises a first side guide configured to support one side in the width direction of the strip, and a second side guide configured to support the other side in the width direction of the strip, the lateral direction injection unit comprises a first lateral direction injection unit configured to inject high-pressure water between the first side guide and the one side of the strip, and a second lateral direction injection unit configured to inject high-pressure water between the second side guide and the other side of the strip, the first lateral direction injection unit and the second lateral direction injection unit are configured to regulate a high-pressure water injection flow rate, and the first lateral direction injection unit and the second lateral direction injection unit regulate the high-pressure water injection flow rate to increase the high-pressure water injection flow rate to a side guide having larger friction with the strip among the first side guide and the second side guide.

6. The apparatus according to claim 5, further comprising: a first sensing unit configured to detect a frictional force between the first side guide and the strip; a second sensing unit configured to detect a frictional force between the second side guide and the strip; and a controller electrically connected to the first sensing unit, the second sensing unit, the first lateral direction injection unit, and the second lateral direction injection unit, wherein the controller compares the frictional force detected through the first sensing unit and the frictional force detected through the second sensing unit, and as a result of the comparison of the frictional forces, regulates high-pressure water injection flow rates of the first lateral direction injection unit and the second lateral direction injection unit to increase the high-pressure water injection flow rate to a side guide having larger friction with the strip among the first side guide and the second side guide.

7. The apparatus according to claim 1, further comprising a forward direction injection unit configured to inject high-pressure water in the moving direction of the strip from an upstream side of the side guide toward the upper surface of the strip, wherein the side guide comprises a first side guide configured to support one side in the width direction of the strip, and a second side guide configured to support the other side in the width direction of the strip, and the forward direction injection unit is capable of biasedly injecting a high-pressure water injection flow rate to any one of the first side guide and the second side guide.

8. The apparatus according to claim 7, wherein the forward direction injection unit comprises a plurality of forward injection nozzles arranged along the width direction of the strip to inject high-pressure water to the upper surface of the strip, each of which is configured to regulate high-pressure water injection flow rate, and the plurality of forward injection nozzles regulates the high-pressure water injection flow rate to increase the high-pressure water injection flow rate to a side guide having larger friction with the strip among the first side guide and the second side guide.

9. The apparatus according to claim 8, further comprising: a first sensing unit configured to detect a frictional force between the first side guide and the strip; a second sensing unit configured to detect a frictional force between the second side guide and the strip; and a controller electrically connected to the first sensing unit, the second sensing unit, and the plurality of forward injection nozzles, wherein the controller compares the frictional force detected through the first sensing unit and the frictional force detected through the second sensing unit, and as a result of the comparison of the frictional forces, regulates high-pressure water injection flow rates of the plurality of forward injection nozzles to increase the high-pressure water injection flow rate to a side guide having larger friction with the strip among the first side guide and the second side guide.

10. An apparatus for removing foreign substances from a hot-rolled steel strip, the foreign substances generated by friction between the strip and a side guide provided to guide a movement of the strip toward an entrance of a winder in a hot rolling process, wherein the apparatus comprises the side guide, the winder, and a reverse direction injection unit configured to inject high-pressure water in the reverse direction of a moving direction of the strip toward the strip moving to the entrance of the winder by the side guide, the reverse direction injection unit comprises a plurality of upper reverse direction injection nozzles arranged along a width direction of the strip to inject high-pressure water to an upper surface of the strip, and the plurality of upper reverse direction injection nozzles is arranged such that an interval of the upper reverse direction injection nozzles located in a central area along the width direction is narrower than an interval of the upper reverse direction injection nozzles located in both of edge areas along the width direction, the apparatus further comprising a lateral direction injection unit configured to inject high-pressure water between the side guide and the strip and to regulate a high-pressure water injection flow rate to increase a flow rate of high-pressure water to be injected in proportion to a threshold temperature at which sparks occur in the strip depending on a steel type thereof.

11. The apparatus according to claim 10, wherein the side guide comprises a first side guide configured to support one side in the width direction of the strip, and a second side guide configured to support the other side in the width direction of the strip, the lateral direction injection unit comprises a first lateral direction injection unit configured to inject high-pressure water between the first side guide and the one side of the strip, and a second lateral direction injection unit configured to inject high-pressure water between the second side guide and the other side of the strip, the first lateral direction injection unit and the second lateral direction injection unit are configured to regulate a high-pressure water injection flow rate, and the first lateral direction injection unit and the second lateral direction injection unit regulate the high-pressure water injection flow rate to increase the high-pressure water injection flow rate to a side guide having larger friction with the strip among the first side guide and the second side guide.

12. The apparatus according to claim 11, further comprising:

a first sensing unit configured to detect a frictional force between the first side guide and the strip; a second sensing unit configured to detect a frictional force between the second side guide and the strip; and a controller electrically connected to the first sensing unit, the second sensing unit, the first lateral direction injection unit, and the second lateral direction injection unit, wherein the controller compares the frictional force detected through the first sensing unit and the frictional force detected through the second sensing unit, and as a result of the comparison of the frictional forces, regulates high-pressure water injection flow rates of the first lateral direction injection unit and the second lateral direction injection unit to increase the high-pressure water injection flow rate to a side guide having larger friction with the strip among the first side guide and the second side guide.

13. An apparatus for removing foreign substances from a hot-rolled steel strip, the foreign substances generated by friction between the strip and a side guide provided to guide a movement of the strip toward an entrance of a winder in a hot rolling process, wherein the apparatus comprises the side guide, the winder, and a reverse direction injection unit configured to inject high-pressure water in the reverse direction of a moving direction of the strip toward the strip moving to the entrance of the winder by the side guide, the reverse direction injection unit comprises a plurality of upper reverse direction injection nozzles arranged along a width direction of the strip to inject high-pressure water to an upper surface of the strip, and the plurality of upper reverse direction injection nozzles is arranged such that an interval of the upper reverse direction injection nozzles located in a central area along the width direction is narrower than an interval of the upper reverse direction injection nozzles located in both of edge areas along the width direction, the apparatus further comprising a forward direction injection unit configured to inject high-pressure water in the moving direction of the strip from an upstream side of the side guide toward the upper surface of the strip, wherein the side guide comprises a first side guide configured to support one side in the width direction of the strip, and a second side guide configured to support the other side in the width direction of the strip, and the forward direction injection unit is capable of biasedly injecting a high-pressure water injection flow rate to any one of the first side guide and the second side guide.

14. The apparatus according to claim 13, wherein the forward direction injection unit comprises a plurality of forward injection nozzles arranged along the width direction of the strip to inject high-pressure water to the upper surface of the strip, each of which is configured to regulate high-pressure water injection flow rate, and the plurality of forward injection nozzles regulates the high-pressure water injection flow rate to increase the high-pressure water injection flow rate to a side guide having larger friction with the strip among the first side guide and the second side guide.

15. The apparatus according to claim 14, further comprising:

a first sensing unit configured to detect a frictional force between the first side guide and the strip; a second sensing unit configured to detect a frictional force between the second side guide and the strip; and a controller electrically connected to the first sensing unit, the second sensing unit, and the plurality of forward injection nozzles, wherein the controller compares the frictional force detected through the first sensing unit and the frictional force detected through the second sensing unit, and as a result of the comparison of the frictional forces, regulates high-pressure water injection flow rates of the plurality of forward injection nozzles to increase the high-pressure water injection flow rate to a side guide having larger friction with the strip among the first side guide and the second side guide.

* * * * *